United States Patent [19]

Ruckert et al.

[11] 3,751,285

[45] Aug. 7, 1973

[54] PROCESS FOR THE PRODUCTION OF REPROGRAPHIC MATERIALS BY DEPOSITING A LIGHT-SENSITIVE LAYER BY EVAPORATION

[75] Inventors: Hans Ruckert, Wiesbaden-Schierstein; Heinz Kramer, Wiesbaden-Bierstadt; Gustav Agustein, Rudesheim, all of Germany

[73] Assignee: Kalle Aktiengesellschaft, Wiesbaden-Bierbrich, Germany

[22] Filed: Sept. 27, 1971

[21] Appl. No.: 184,299

[30] Foreign Application Priority Data

Sept. 29, 1970 Germany .................. P 20 47 816.4

[52] U.S. Cl. .......................... 117/34, 96/33, 96/36, 96/36.2, 96/67, 96/75, 96/86 R, 96/91 D, 117/61, 117/119

[51] Int. Cl. ....... G03c 1/76, G03c 1/94, G03c 1/54

[58] Field of Search ........................ 96/75, 33 R, 36, 96/36.2, 36.3, 86 R, 87 R, 115 R, 91 D, 91 N, 94 BF, 91 R, 67; 117/34, 119, 61; 101/456, 458, 459

[56] References Cited

UNITED STATES PATENTS

| | | | |
|---|---|---|---|
| 3,627,599 | 12/1971 | Goldmacher | 96/115 P |
| 3,647,443 | 3/1972 | Rauner et al. | 96/91 D |
| 3,669,658 | 6/1972 | Yonezawa et al. | 96/91 D |
| 3,661,582 | 5/1972 | Broyde | 96/91 D |
| 3,455,914 | 7/1969 | Ruckert | 96/33 X |
| 3,219,451 | 11/1965 | LuValle et al. | 96/94 BF X |
| 3,276,869 | 10/1966 | McCune | 96/29 X |
| 3,026,218 | 3/1962 | Morgan | 117/34 X |
| 3,301,674 | 1/1967 | Uhlig | 96/91 D X |
| 3,440,959 | 4/1969 | Wagner | 96/33 X |
| 3,551,344 | 12/1970 | Gardlund et al. | 96/90 PC X |
| 3,639,250 | 2/1972 | Schutt et al. | 96/90 PC X |
| 3,650,743 | 3/1972 | Hallman et al. | 96/33 |
| 3,495,979 | 2/1970 | Laridon et al. | 96/91 D X |

OTHER PUBLICATIONS

Chemical Abstracts, Vol. 60, 1964, 10102c–d (Belgian 622,967).

Uhlig; F., The Journal of Photo. Sci., Vol. 18, 1970, p. 4–7.

Kobayashi et al., Abstracts of Photo. Sci. & Eng., No. 829/70.

*Primary Examiner*—Charles L. Bowers, Jr.

*Attorney*—James E. Bryan

[57] ABSTRACT

This invention relates to a process for the production of reprographic copying materials which comprises applying a light-sensitive layer to a support by evaporation at reduced pressure, the layer comprising at least one light-sensitive quinone diazide sulfonic acid derivative of the general formulae (I)

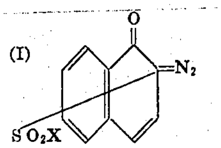

(II)

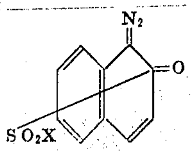

(III)

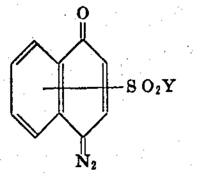

(IV)

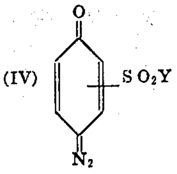

or a nitrone of the general formula (V) $R{-}(CH{=}CH)_n{-}CH{=}\overset{\downarrow}{N}{-}R'$ (with $\downarrow O$ on N)

in which

X is selected from the group consisting of an alkoxy group having one to 10 carbon atoms,
a cycloalkoxy group having five to 12 carbon atoms,
an aryloxy group having six to 15 carbon atoms, or
an amine group derived from a primary or secondary amine containing alkyl groups having one to 10 carbon atoms, cycloalkyl groups having five to 12 carbon atoms or aryl groups having six to 14 carbon atoms as substituents at the nitrogen or from a mononuclear N-heterocyclic compound, Y is selected from the group consisting of an aryloxy group having six to 15 carbon atoms, or
an amine group derived from a primary or secondary amine containing alkyl groups having one to 10 carbon atoms, cycloalkyl groups having five to 12 carbon atoms or aryl groups having six to 14 carbon atoms as substituents at the nitrogen or from a mononuclear N-heterocyclic compound, R and R′ are mononuclear aromatic groups, and

*n* is 0 or 1.

12 Claims, No Drawings

PROCESS FOR THE PRODUCTION OF REPROGRAPHIC MATERIALS BY DEPOSITING A LIGHT-SENSITIVE LAYER BY EVAPORATION

The present invention relates to the application of a uniform thin layer, containing a light-sensitive organic nitrogen compound as the primary constituent, to a support by vacuum deposition.

For the production of reprographic copying materials, it is known to apply light-sensitive substances, if desired with additions of resins, dyes, sensitizers, and the like, from a solution or dispersion to a support, usually of paper, metal or plastic material, and to solidify them thereon. Known are, for example, storable copying materials for the production of printing forms, which contain quinone diazides or nitrones as the light-sensitive layer constituent.

The application of the light-sensitive layer to the support usually is performed by immersion, dosed casting, transferring, whirling or spraying the coating liquid, sometimes also by electrophoresis. With all of these processes, particularly because of the surface tension of the drying solution, it is not possible to produce thin layers sufficiently uniform for extremely fine resolution, particularly not on finely structured surfaces, e.g., on superficially grained supports.

The present invention provides a possibility for avoiding this disadvantage. This is achieved by a process for the production of reprographic materials by applying to a support a light-sensitive layer by evaporation in a vacuum. A light-sensitive aromatic nitrogen compound is evaporated substantially undecomposed and the vapor is deposited on a support, the compound being a quinone diazide sulfonic acid derivative of one of the general formulae I, II, III or IV of the following formulae or a nitrone of the general formula V, (I)
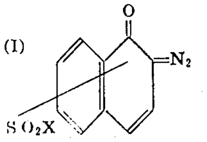
(II)
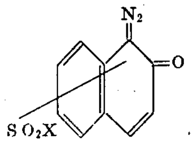
(III)
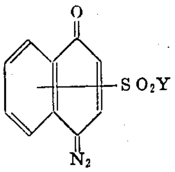
(IV)
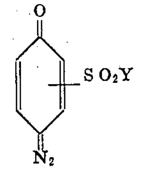

or a nitrone of the general formula (V) $R{-}(CH{=}CH)_n{-}CH{=}N{-}R'$ (with $N \rightarrow O$)

wherein

X is an alkoxy group having one to 10 carbon atoms, or a cycloalkoxy group having five to 12 carbon atoms, or an aryloxy group having six to 15 carbon atoms, or an amide group derived from a primary or secondary amine containing alkyl groups having one to 10 carbon atoms, cycloalkyl groups having five to 12 carbon atoms or aryl groups with six to 14 carbon atoms as substituents at the nitrogen or from a mononuclear N-heterocyclic compound, Y is the same as X with the exception of alkoxy and cycloalkoxy radicals R and R' are mononuclear aromatic groups, and n is 0 or 1.

Most of the light-sensitive compounds used in accordance with the invention are known as such and regarding their application in reprographic copying materials, e.g., from German Pat. Specifications Nos. 854,890; 865,109; 865,410; 930,608; 938,233; 960,335, and U. S. Pat. Specifications Nos. 2,772,972; 3,416,922, and 3,455,914. Those compounds which have not been described before are prepared in a manner analogous to that of the known compounds.

Examples of light-sensitive compounds to be used in accordance with the present invention are: naphthoquinone-(1,2)-diazide-(2)-5-sulfonic acid ethyl ester, naphthoquinone-(1,2)-diazide-(2)-5-sulfonic acid isopropyl ester, naphthoquinone-(1,2)-diazide-(2)-4-sulfonic acid butyl ester, naphthoquinone-(1,2)-diazide-(1)-5-sulfonic acid-(2-ethylhexyl)-ester, naphthoquinone-(1,2)-diazide-(2)-5-sulfonic acid benzyl ester, naphthoquinone-(1,2)-diazide-(2)-5-sulfonic acid cyclohexyl ester, naphthoquinone-(1,2)-diazide-(2)-5-sulfonic acid-(3-hydroxyphenyl)-ester, naphthoquinone-(1,2)-diazide-(2)-4-sulfonic acid-(3,5-dimethyl-phenyl)-ester, naphthoquinone-(1,2)-diazide-(1)-5-sulfonic acid naphthyl ester, 2,3,4-trihydroxy-benzophenone-naphthoquinone-(1,2)-diazide-(2)-5-sulfonic acid-di- and triester, naphthoquinone-(1,2)-diazide-(2)-4-sulfonic acid ester of the 2,4-dihydroxy-benzoic acid anilide, naphthoquinone-(1,2)-diazide-(2)-4-sulfonic acid anilide, naphthoquinone-(1,2)-diazide-(2)-5-sulfonic acid-(N-methyl-N-ethoxycarbonylmethyl)-amide, naphthoquinone-(1,2)-diazide-(1)-6-sulfonic acid-p-toluidide, naphthoquinone-(1,2)-diazide-(2)-5-sulfonic acid-cyclohexylamide, naphthoquinone-(1,2)-diazide-(2)-4-sulfonic acid-benzylamide, naphthoquinone-(1,2)-diazide-(2)-5-sulfonic acid-isooctylamide, naphthoquinone-(1,2)-diazide-(2)-5-sulfonic acid-*n*-butylamide, naphthoquinone-(1,2)-diazide-(2)-5-sulfonic acid-morpholide, naphthoquinone-(1,2)-diazide-(2)-5-sulfonic acid-pyrrolidide, benzoquinone-(1,4)-diazide-(4)-3-sulfonic acid anilide, benzoquinone-(1,4)-diazide-(4)-2-sulfonic acid-N-ethyl-anilide, naphthoquinone-(1,4)-diazide-(4)-2-sulfonic acid-p-cresyl-ester, naphthoquinone-(1,4)-diazide-(4)-3-sulfonic acid-benzyl ester, naphthoquinone-(1,4)-diazide-(4)-5-sulfonic acid-cyclopentyl ester, benzoquinone-(1,4)-diazide-(4)-2-sulfonic acid-β-naphthyl amide, cinnamic aldehyde-N-phenyl-nitrone, C-(4-azido-phenyl)-N-*p*-tolyl-nitrone, C-(4-hydroxy-3-methoxy-phenyl)-N-phenyl-nitrone, C-(3-azido-5-chloro-phenyl)-N-*o*-tolyl-nitrone, and the like.

It is known that a number of substances, e.g., metals, photoconductors (particularly selenium), silver halides and also organic compounds, such as dyes, can be deposited with high purity and uniformity down to very small layer thicknesses by evaporation in a vacuum. As far as light-sensitive substances are concerned, these are practically exclusively inorganic and thus, of course, substantially more resistant to elevated temperatures than the extraordinarily thermolabile organic light-sensitive substances which are conventional and suitable for the production of reprographic materials.

It is thus particularly surprising that the foregoing light-sensitive aromatic nitrogen compounds, under suitable conditions, can be evaporated in substantially undecomposed form and deposited to yield uniform homogeneous layers. A prerequisite for the formation of homogeneous faultless copying layers from such substances is to avoid any crystallization. Resins or other constituents preventing or considerably inhibiting crystallization of the light-sensitive organic compound therefore often are added to the known reprographic copying layers. It is further very surprising that most of the compounds used in accordance with the invention, particularly the preferred group of o-naphthoquinone diazide sulfonic acid amides, can be deposited from the vapor phase in a practically pure form to yield completely homogeneous crystal-free layers.

If they are not sufficiently adhesive, the layers produced in accordance with the invention may be further solidified by a thermal after-treatment. As is known, the method of vapor deposition in a vacuum presents the decisive advantage that, within the scope of the geometric conditions, uniformly thick layers are obtained, independently of the shape of the surface of the substrate. Also in the case of a finely structured surface, the shape thus remains unchanged by coating since - with prevention of shadow effects, e.g., by sufficiently large evaporation surfaces or relative movement between the evaporation source and the substrate, and with geometrically equivalent surface parts - the same quantity of substance is deposited per surface unit and time unit at each point of the substrate, provided care is taken that the free path of the molecules in the gas volume is sufficiently long, i.e., the molecular ray behaves similarly to a light ray. According to the impact laws for ideal gases, this primarily requires a sufficiently low gas pressure, generally below about $10^{-4}$ mm Hg.

Of the initially mentioned quinone diazides and nitrones which have proved suitable for the use in the process of the invention, the naphthoquinone-(1,2)-diazide-(2)-sulfonic acid esters and amides (formula I) are preferred. The naphthoquinone-(1,2)-diazide-(2)-sulfonic acid amides derived from primary aliphatic amines with two to nine carbon atoms have proved particularly suitable since they yield particularly uniform layers even without crystallization-inhibiting additives.

Examples of these particularly preferred compounds are: naphthoquinone-(1,2)-diazide-(2)-4- and -5-sulfonic acid amides derived from ethyl amine, isopropyl amine, *n*-butyl amine, isohexyl amine, isooctyl amine, *n*-octyl amine, and isononyl amine. These compounds have not been described in the literature.

It is also possible, however, to use sulfonic acid esters and amides of *o*-naphthoquinone-diazide-(1) or of *p*-naphthoquinone-diazide or of p-benzoquinone-diazide, furthermore also nitrones, of the general formulae I to V, insofar as they are sufficiently volatile, e.g., where their molecular weights do not exceed about 800, preferably about 500. The volatility is determined not only by the molecular weight but also by the polarity of the compounds. For the process of the invention, there are also preferred those compounds which contain no polar substituents in the molecule or only those with low polarity, e.g., alkyl groups, halogen atoms, alkoxy groups, and the like. The compounds can be used alone or in admixture with one another.

In some cases, it has proved advantageous to apply a resin by evaporation simultaneously with the light-sensitive substance since the crystallization tendency of the light-sensitive substance may be considerably reduced thereby. Particularly suitable are novolak resins with molecular weights up to about 1,000, e.g., Alnovol PN 429 and Alnovol VPN 12. When the resin has a different vapor pressure than the light-sensitive substance (which generally is the case) the mixed deposition preferably is performed from two separate evaporation sources, the temperature of each depending upon the vapor pressure difference concerned and the desired mixing ratio of the two layer constituents on the substrate. In this manner, it is still possible to obtain excellent homogeneous layers with the representatives of the above-mentioned light-sensitive compounds which have a higher crystallization tendency when deposited from the vapor phase.

Sometimes, it is desirable to use colored light-sensitive layers. In a specific embodiment of the process of the invention, they also may be produced by vapor deposition in that a volatile dye is deposited simultaneously with the light-sensitive substance. Cellitonechtblau FR (C.I. 61,115) and Cellitonechtblau B (C.I. 61,500) have proved suitable, for example, but, according to German Offenlegungsschrift No. 1,469,672, almost all commercial dispersion, vat, spirit or pigment dyes are suitable if their molecular weights are below 800. Since the vapor pressure of the dye generally differs from that of the light-sensitive substance, separate evaporation sources are preferred also in this case for the two layer constituents in order to be able to adjust different evaporation temperatures.

The process of the invention is further illustrated by way of the following exemplary embodiments. It is up to the expert, of course, to adapt the process by suitable modifications he is aware of to the conditions and requirements of the individual case concerned. If a continuous process is desirable, it is also possible, for example, to pass the support, to which a layer is to be applied by evaporation in known manner, continuously past the evaporation source.

EXAMPLE 1

A rectangular dish of the dimensions 85 × 54 × 13 mm is uniformly filled with a 1 to 2 mm thick layer of naphthoquinone-(1,2)-diazide-(2)-4-sulfonic acid-(4-cumyl-phenyl)-ester and placed on heatable tungsten wires. At a distance therefrom of about 20 cm, in a substrate holder, there is a 180 × 180 mm mechanically roughened aluminum sheet as is conventional for planographic printing plates. After evacuation of the receptacle containing the aforementioned components to a pressure of about $2 \times 10^{-5}$ mm Hg, the dish is heated slowly, in the present case for 10 minutes, until a deposition rate between 0.01 to 0.2 $\mu$m per minute is achieved. The corresponding temperature is maintained constant until the light-sensitive substance is deposited on the substrate in the desired layer thickness, generally between 0.01 to 5 $\mu$m. In the present case, vapor deposition continues for 5 minutes.

The reprographic material produced in this manner has a good storability. After imagewise exposure to ultraviolet light, it may be developed in the usual manner with 1 per cent trisodium phosphate solution and, after subsequent application of greasy ink, used as an offset printing plate.

EXAMPLE 2

Naphthoquinone-(1,2)-diazide-(2)-5-sulfonic acid cyclohexyl amide is deposited by evaporation from a dish, as in Example 1at a pressure of $2 \times 10^{-5}$ mm Hg on a matted glass plate. Heating is performed by means of a current-carrying carbon rod arranged above the dish. The temperature of the substance to be evaporated is measured by means of a thermoelement and maintained at 85° C. during evaporation. Evaporation continues for 5 minutes. Onto the sensitized glass plate obtained, an image is projected from an enlargement device operating with strong ultraviolet light. After exposure to light, the plate is developed by wiping over with 2 per cent trisodium phosphate solution. The glass is then etched with dilute hydrofluoric acid in the exposed and bared areas.

EXAMPLE 3

In a dish as described in Example 1, there is first spread a 1.5 mm thick layer of glass powder. Onto this layer, there is placed a 2 mm thick layer of naphthoquinone-(1,2)-diazide-(2)-5-sulfonic acid-n-butylamide, the temperature of which can be measured by means of a thermoelement. The dish is placed onto heatable tungsten wires. The substrate used is a glass plate to which a layer of nickel has been applied by evaporation. At a pressure of $5 \times 10^{-5}$ mm Hg, the light-sensitive substance is heated until the thermoelement has a temperature of 89° C. This temperature is maintained for 5 minutes. After evaporation, the layer thickness is photometrically determined on part of the glass plate, by separating the layer in acetone and determination of the extinction at 398 nm, and is 0.50 $\mu$m. The other part of the glas plate is developed by immersion in 1 per cent trisodium phosphate solution and etched during 1 minute with 3 per cent ferric chloride solution. A positive metal mask corresponding to the original is thus obtained.

Light-sensitive materials are produced in the same manner by depositing the isobutyl amide, isoamyl amide, and isononyl amide of the above-stated naphthoquinone diazide sulfonic acid.

In each case, copying layers with an excellent homogeneity are obtained. In the case of the isononyl amide, a longer evaporation time is necessary, however, in order to obtain a uniform layer.

EXAMPLE 4

A 1.5 mm thick layer of cinnamic aldehyde-N-phenylnitrone is spread in a dish and the dish is placed beneath a carbon rod as in Example 2. In a dish of the same dimensions, there is placed a 2 mm thick layer of a phenol-formaldehyde novolak of a melting point of about 105° to 115° C (Alnovol PN 429, Chemische Werke Albert, Wiesbaden-Biebrich, Germany) and the dish is placed on heatable tungsten wires positioned beside the first dish. The substrate used is brushed aluminum as in Example 1. At a pressure of $2 \times 10^{-5}$ mm Hg, evaporation is performed simultaneously from both dishes. The aluminum plate provided with the deposit is exposed to light as in Example 1 and developed with 9 per cent trisodium phosphate solution.

EXAMPLE 5

One dish is filled with a thin layer of the light-sensitive compound used in Example 3 and one dish with a thin layer of the dye Cellitonechtblau B (C.I. 61,500). Evaporation is performed in each case with an independently heated carbon rod. The substrate used is brushed aluminum as in Example 1. The adhesion of this layer may be increased by heating for about 1 hour to about 100° C. After exposure and development with 5 per cent trisodium phosphate solution, a blue image of the original is obtained.

Under substantially the same conditions, light-sensitive layers are applied by evaporation to the same support material.

The light-sensitive substances used are the morpholide, the di-n-butyl-amide, the n-butyl ester and the isopropyl ester of naphthoquinone-1,2-diazide-(2)-5-sulfonic acid. The novolak resin Alnovol VPN 12 is used in these cases instead of the dyestuff.

After exposure and development, planographic printing plates of good quality are obtained.

EXAMPLE 6

As described in Example 4, one dish is filled with C-(4-azido-phenyl)-N-phenyl-nitrone and one with the novolak used in Example 4 and, as described there, applied by evaporation to a substrate consisting of a perforated plate of a phenoplast composite material (Pertinax(R)) provided on both sides with a copper skin. The plate to which the deposit has been applied is exposed under a negative original of an electric circuit and the layer is removed in the unexposed areas by wiping it over with 8 per cent trisodium phosphate solution. The bared copper is etched with ammonium persulfate.

EXAMPLE 7

As described in Example 1, benzoquinone-(1,4)-diazide-(4)-2-sulfonic acid-(N-ethyl-anilide) is applied by evaporation to brushed aluminum and processed as described there. The developer used is 10 per cent phosphoric acid.

EXAMPLE 8

As described in Example 2, naphthoquinone-(1,2)-diazide-(2)-5-sulfonic acid-(2,3,4-trihydroxy-benzophenone)-ester is applied by evaporation to coarse-milled zinc and processed as described in Example 1. The developer used is 2 per cent trisodium phosphate solution.

EXAMPLE 9

A 1.5 mm thick layer of naphthoquinone-(1,2)-diazide-(2)-5-sulfonic acid-n-butyl amide is spread in a dish and evaporated under a carbon bar. Into a similar dish, there is poured a 2 mm thick layer of the novolak resin used in Example 4 and the dish is placed on tungsten wires as in Example 4. The substrate used is brushed aluminum as in Example 1. At a pressure of $2 \times 10^{-5}$ mm Hg, evaporation is performed simultaneously from both dishes. The aluminum plate to which the deposit has been applied is exposed to light as in Example 1 and developed with 2 per cent trisodium phosphate solution.

It will be obvious to those skilled in the art that many modifications may be made within the scope of the present invention without departing from the spirit thereof, and the invention includes all such modifications.

What is claimed is:

1. A process for the production of reprographic copying materials which comprises evaporating a light-sensitive organic nitrogen compound, substantially without decomposition, at an elevated temperature and in a vacuum of not more than $10^{-4}$ mm Hg, and depositing the vapor on a support to form a light-sensitive layer, the compound being at least one light-sensitive quinone diazide sulfonic acid derivative of one of the general formulae

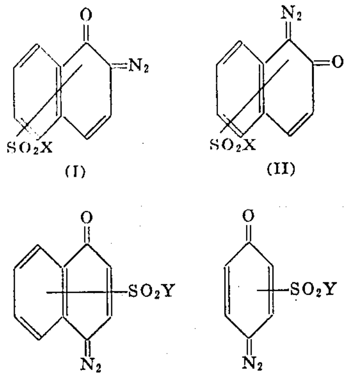
(I) (II) (III) (IV)

or a nitrone of the general formula $$R-(CH{=}CH)_n-CH{=}\underset{\downarrow \atop O}{N}-R' \quad (V)$$

in which

X is selected from the group consisting of an alkoxy group having one to 10 carbon atoms, a cycloalkoxy group having five to 12 carbon atoms, an aryloxy group having six to 15 carbon atoms, or an amine group derived from a primary or secondary amine containing alkyl groups having one to 10 carbon atoms, cycloalkyl groups having five to 12 carbon atoms or aryl groups having six to 14 carbon atoms as substituents at the nitrogen, or from a mononuclear N-heterocyclic compound, Y is selected from the group consisting of an aryloxy group having six to 15 carbon atoms, or an amine group derived from a primary or secondary amine containing alkyl groups having one to 10 carbon atoms, cycloalkyl groups having five to 12 carbon atoms or aryl groups having six to 14 carbon atoms as substituents at the nitrogen or from a mononuclear N-heterocyclic compound, R and R' are mononuclear aromatic groups, and

*n* is 0 or 1.

2. A process according to claim 1 in which a volatile resin is applied by evaporation simultaneously with the light-sensitive compound.

3. A process according to claim 1 in which a volatile dye is applied by evaporation simultaneously with the light-sensitive compound.

4. A process according to claim 1 in which the light-sensitive compound is of formula I.

5. A process according to claim 4 in which a compound is used in which X is the radical of a primary aliphatic amine having two to 9 carbon atoms.

6. A process according to claim 1 in which the light-sensitive compound is naphthoquinone-(1,2)-diazide-(2)-4-sulfonic acid-(4-cumylphenyl)-ester.

7. A process according to claim 1 in which the light-sensitive compound is naphthoquinone-(1,2)-diazide-(2)-5-sulfonic acid cyclohexyl amide.

8. A process according to claim 1 in which the light-sensitive compound is naphthoquinone-(1,2)-diazide-(2)-5-sulfonic acid *n*-butylamide.

9. A process according to claim 1 in which the light-sensitive compound is cinnamic aldehyde-N-phenylnitrone.

10. A process according to claim 1 in which the light-sensitive compound is C-(4-azido-phenyl)-N-phenylnitrone.

11. A process according to claim 1 in which the light-sensitive compound is benzoquinone-(1,4)-diazide-(4)-2-sulfonic acid-(N-ethyl-anilide).

12. A process according to claim 1 in which the light-sensitive compound is naphthoquinone-(1,2)-diazide-(2)-5-sulfonic acid-(2,3,4-trihydroxy-benzophenone)-ester.

* * * * *